United States Patent [19]

Hauke et al.

[11] Patent Number: 4,841,187
[45] Date of Patent: Jun. 20, 1989

[54] ELECTRIC MOTOR WITH ATTACHED TACHOGENERATOR

[75] Inventors: Dieter Hauke, Hatten; Edgar Zelle, Rastede, both of Fed. Rep. of Germany

[73] Assignee: Licentia Patent-Verwaltungs-GmbH, Frankfurt am Main, Fed. Rep. of Germany

[21] Appl. No.: 197,183

[22] Filed: May 23, 1988

[30] Foreign Application Priority Data

May 22, 1987 [DE] Fed. Rep. of Germany ....... 3717180

[51] Int. Cl.⁴ .................. H02K 5/10; H02K 5/124; G01P 1/04; H02H 7/093
[52] U.S. Cl. ................................. 310/171; 73/493; 310/88; 310/89
[58] Field of Search ............ 73/493; 310/43, 89, 310/90, 91, 112, 113, 171, 42, 88, 239, 268

[56] References Cited

U.S. PATENT DOCUMENTS

| | | | |
|---|---|---|---|
| 3,749,949 | 7/1973 | Müller | 310/112 |
| 4,637,488 | 1/1987 | Fotheringham et al. | 73/493 |
| 4,680,495 | 7/1987 | Chiampas | |
| 4,759,218 | 7/1988 | Rodi et al. | 73/493 |

FOREIGN PATENT DOCUMENTS

| | | |
|---|---|---|
| 1751717 | 9/1957 | Fed. Rep. of Germany |
| 7040666 | 11/1970 | Fed. Rep. of Germany |
| 2147982 | 3/1973 | Fed. Rep. of Germany |
| 1962986 | 2/1987 | Fed. Rep. of Germany |

Primary Examiner—Patrick R. Salce
Assistant Examiner—D. L. Rebsch
Attorney, Agent, or Firm—Spencer & Frank

[57] ABSTRACT

An electric motor with attached tachogenerator wherein the tachogenerator may be attached to electric motors of varying types without significantly changing the housing or motor shaft bearing plate configuration and while maintaining the required environmental protection. The rpm signal generator of the tachogenerator is placed onto a motor shaft end portion which extends out of the motor housing through the shaft bearing plate and is enclosed by a closable housing accommodating a detector, e.g. a coil. The housing is latchable, for example by means of detent hooks, to the bearing plate or motor housing. The arrangement is particularly useful for electric motors where dust free and liquid tight protection is required.

16 Claims, 1 Drawing Sheet

U.S. Patent    Jun. 20, 1989    4,841,187

ELECTRIC MOTOR WITH ATTACHED TACHOGENERATOR

BACKGROUND OF THE INVENTION

The present invention relates to an electric motor with an attached tachogenerator or tachometer whose rpm sensor, which preferably is configured as an annular permanent magnet, rotates together with the rotatable output shaft of the motor and charges a stationary detector, preferably an annular coil.

Motors of this type are required to be manufactured in many different structural sizes for a multitude of applications where control of the rpm of the motor is required. Often, the motors are used under conditions which necessitate dust and/or liquid tight encapsulation of the motor. The positioning of the tachogenerator within the encapsulation of the motor is often not possible due to the lack of space therein, and often the construction of a special, expensively manufactured motor housing of correspondingly larger volume is required. This is a drawback particularly in those cases in which motors of a certain type are manufactured with and without a tachogenerator.

SUMMARY OF THE INVENTION

It is an object of the invention to provide a way to equip electric motors of conventional construction with a tachogenerator without having to substantially change the customarily employed housing or the bearing plate of the electric motor and without having to restrict the type of structural protection afforded this type of motor.

The above object is basically achieved according to the present invention by an electric motor with an attached tachogenerator wherein the electric motor has a rotatably mounted motor shaft having an end portion which extends outside of a shaft bearing plate of the motor housing through a bore in the bearing plate; wherein the tachogenerator includes an rpm signal generator, for example an annular permanent magnet, which rotates with the motor shaft relative to a stationary detector means, for example a coil, which is positioned adjacent the sensor and is responsive to the signals from the generator, for providing an output corresponding to the rpm of the motor shaft; wherein the rpm sensor is mounted on the end portion of the motor shaft outside the bearing plate; and wherein a closeable housing is provided which surrounds the sensor and the detector means and is fastened to the motor housing.

According to the general features of the invention, the closeable housing includes a cylindrical member, preferably with an annular bottom, which is provided with means for fastening the cylindrical member to the motor housing disposed at the end of the cylindrical member facing the motor housing; and a cap is provided for closing the other end of said cylindrical member in a form locking and water tight manner. Preferably the means for fastening the closeable housing to the motor housing includes a plurality of detent hooks which pass through the bore of the bearing plate and engage the interior surface of the bearing plate.

The advantage of the invention is that it is now possible, in the simplest manner, to equip electric motors of all types with tachogenerators without having to make changes in the motor structure. The principle of the proposed solution can be used for all motors of all available sizes. The components of the housing required to cover the tachogenerator can be produced simply and economically. Due to the shape of the housing structure, the ejection mold required for manufacturing the housing is of simple configuration. The required motor protection is maintained in an advantageous manner without additional expenditures simply by this particular configuration of the housing.

DETAILED DESCRIPTION OF THE PREFERRED EMBODIMENT

Figure 1:
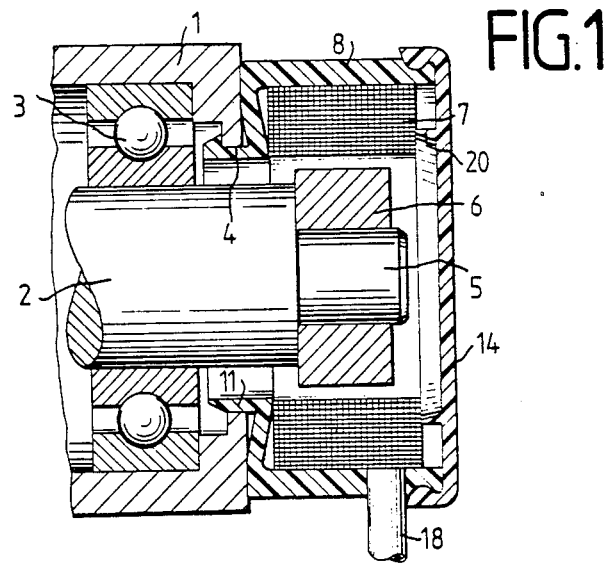
FIG. 1 is a view of a preferred embodiment of the invention including a closed housing fastened to the bearing motor housing and accommodating the tachometer coil.

In FIG. 1, the motor shaft 2 of an electric motor is rotatably mounted by means of a bearing 3 in a schematically illustrated bearing plate 1 of the motor housing. In a conventional manner, the end of the motor shaft 2 extends through a bore or recess 4 in bearing plate 1 to the exterior of the motor housing. As shown, the exterior end of the shaft 2 may be provided with a shaft step 5 of reduced diameter. Fastened to the shaft step 5 is the rpm or rotation signal generator 6 of the tachogenerator. In the illustrated preferred embodiment of the invention the rpm signal generator 6 is configured as an annular permanent magnet which, for example, changes polarity several times over its circumference. The detector or coil 7 of the tachogenerator surrounds the rpm generator 6 and is disposed in a closeable housing 8. Depending on the consistency or mechanical strength of the coil 7, it may be either fastened directly in the housing 8, or merely placed into housing 8, i.e., if it has sufficient inherent mechanical strength.

Figure 2:
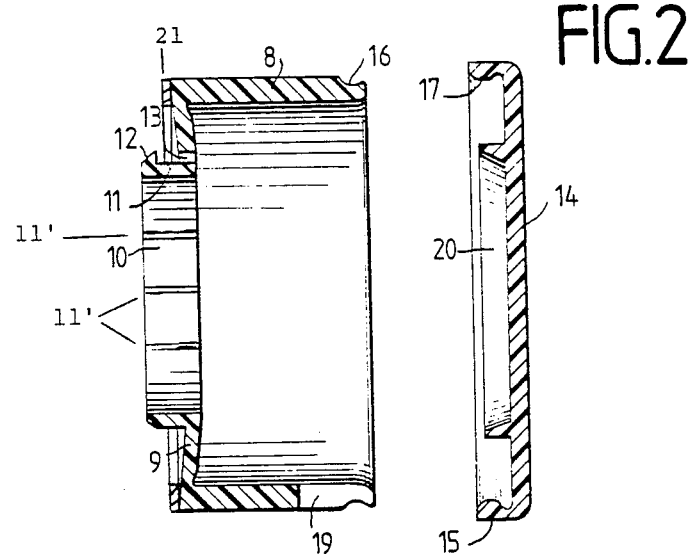
FIG. 2 is an exploded view of the preferred embodiment according to the invention of the housing of FIG. 1 with its associated closing cap or cover.

As more clearly shown in FIG. 2, the housing 8 is essentially a cup-shaped component including cylindrical member having an annular bottom 9 with a passage opening 10 in its center for the extension of the motor shaft 2. The housing 8 is further provided with a cylindrical extension 11 which projects in the direction of the motor axis and is disposed in the passage opening 10, i.e., at the inner edge of the annular bottom 9. The extension 11 has an outer diameter which is substantially equal to the diameter of the bore 4 in the bearing plate 1 so that the extension 11 can be placed almost without radial play into the bore 4. Preferably, extension 11 is subdivided e.g., by means of a plurality of axially extending slots 11' into a plurality of axially extending individual sections or projections, which may have different circumferential lengths. The free ends of some of these individual sections of extension 11 are provided with radially outwardly directed hook portions 12 so as to form respective detent hooks for fastening the housing 8 to the motor housing and in particular to the bearing plate 1. The annular bottom 9 is curved toward the interior of housing 8 and is provided with passages 13 at the height of detent hook portions 12 to facilitate introduction of the associated mold core extractors in the direction of the housing axis and to thus require core extractors which are to be actuated exclusively in this direction for the ejection mold required for production of housing 8.

The free end of housing 8 can be covered in a dust and/or liquid tight manner by means of a closure cap 14 or cover. For this purpose, the cap 14 has a cylindrical rim or edge 15 which surrounds the housing at its open end. The surrounded portion of the outer cylindrical surface of housing 8 is provided with a circumferential channel or groove 16 which forms form-locking, self-holding connection with a bead 17 provided on the inner surface of the cylindrical edge or rim 15 of the closure cap 14.

The housing 8 is provided with an axially extending opening or slot 19 at its open end for the lead 18 (FIG. 1) for the coil 7. As shown, this opening 19 is partially covered by the rim or edge 15 of the cap 14 when it is installed on the housing 8. Moreover, the inner surface of the cap 14 is preferably provided with an annular elastic projection 20 which will engage the end of the coil 7 when the cap 14 is installed on the housing 8.

The housing 8 and the closure cap 14 are preferably made of a plastic material which has sufficient elasticity to be able to connect the individual components with sufficient tightness and reliability merely by a form lock or latching.

To assemble the arrangement shown in FIG. 1, the housing 8 is initially inserted into the recess or bore 4, which may have been previously appropriately enlarged to permit passage of the extension 11 with its hook portions 12. By applying pressure to the bottom 9, detent hook portions 12 latch themselves, as can be seen in FIG. 1, behind recess 4 against the inner surface of the bearing plate 1 without axial play. The concave shape of the bottom 9 augments the spring effect of the material, and produces liquid tight or dust-tight contact between the outer edge of housing 8 and the bearing plate 1 and, due to the longer spring path, serves to compensate for tolerances in the individual components. In an advantageous manner, the outer edge of bottom 9 of housing 8 may additionally be provided with a layer 21 of soft-elastic material so as to provide a reliable seal with the outer surface of the bearing plate 1 regardless of the unevennesses of the cast bearing plate.

Coil 7 is then inserted into the thus secured housing 8 and, if necessary, fastened to the housing, for example, by means of an adhesive. The connecting lead 18 for the coil 7 is brought out through the recess 19 provided toward the free end of housing 8. Then the closing cap 14 is pressed onto housing 8, causing the bead 17 to engage in the channel 16 and thus form a seal. The annular projection 20 on the interior surface of closing cap 14 presses directly on coil 7 and holds it in its position relative to rpm sensor 6.

If connecting lead 18 has a soft sheath and recess 19 is configured to provide a precise fit, the seals provided by a closed housing 8, 14 of the described design, as well as the seal between the housing and the surface of the bearing plate 1 meet the requirements for protection type IP 42.

The present invention is not limited to the above-described preferred embodiment. For example, the housing may be configured as a smooth hollow cylinder provided with fastening means, for example, detent hooks or the like, at its end facing the motor. Moreover, the end of the electric motor shaft may also be brought through the closing cap in order to drive, for example, an attached fan. In this case, a passage opening is provided in the closing cap with this opening having a diameter which is approximately equal to the diameter of the shaft. Thus the elastic material of the closing cap surrounds the shaft without play so that a seal is produced which remains in effect during operation of the electric motor. A closeable housing of the above-described type can also be advantageously used with electric motors whose bearing plates are provided with air passage openings since the latter are not covered when the housing is fastened in the shaft bearing plate.

The present disclosure relates to the subject matter disclosed in Federal Republic of Germany Application No. P 37 17 180.1 on May 22nd, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed:

1. In an electric motor with an attached tachogenerator wherein said electric motor has a rotatably mounted motor shaft having an end portion which extends outside of a shaft bearing plate of the motor housing through a bore in the bearing plate, and wherein said tachogenerator includes an annular permanent magnet which rotates with said motor shaft and a stationary detector means, including an annular coil positioned adjacent and surrounding said magnet, for providing an output corresponding to the rpm of the motor shaft; the improvement wherein said magnet is mounted on said end portion of said motor shaft, and further comprising: a closeable housing including a hollow cylindrical member surrounding said magnet and said annular coil and having an annular bottom at its end facing said motor housing, with said annular bottom having a center passage opening for said motor shaft, and means for fastening said cylindrical member to said motor housing disposed at said end of said cylindrical member facing said motor housing; and a cap closing the other end of said cylindrical member.

2. Apparatus as defined in claim 1 wherein said cap is provided with a central shaft opening, and said end portion of said motor shaft extends through said shaft opening in said cap and is sealingly enclosed thereby.

3. Apparatus as defined in claim 1 wherein said means for fastening said cylindrical member to said motor housing comprises a plurality of detent hooks disposed at said end of said hollow member facing said motor housing, with each said detent hook engaging in an associated recess of said motor housing.

4. Apparatus as defined in claim 1 wherein said cap includes means for fastening said cap to said other end of said cylindrical member in a form-locking and liquid tight manner.

5. Apparatus as defined in claim 2 wherein said means for fastening said cylindrical member to said motor housing comprises a plurality of detent hooks disposed at said end of said hollow member, with each said detent hook engaging in an associated recess of said motor housing.

6. Apparatus as defined in claim 3 wherein said detent hooks have radially outwardly extending hook portions, are disposed in a circle at said one end of said hollow member, and pass through said bore of said bearing plate with said hook portions engaging the interior surface of said bearing plate to latch said closeable housing to said motor housing.

7. Apparatus as defined in claim 3 wherein: said annular bottom of said closeable housing is curved inwardly toward the center of said closeable housing; and said detent hooks are disposed at the inner edge of said annular bottom and project in the direction of the axis of said motor shaft toward said motor housing.

8. Apparatus as defined in claim 7 wherein said detent hooks have radially outwardly extending hook portions and pass through said bore in said bearing plate with said hook portions engaging the interior surface of said bearing plate to latch said closeable housing to said motor housing.

9. Apparatus as defined in claim 8 wherein the length of said detent hooks is such that said hook portions engage said rear surface of said bearing plate without axial play, whereby at least the outer edge region of the outer surface of said annular bottom engages said motor housing.

10. Apparatus as defined in claim 8 wherein: said closeable housing further includes a cylindrical extension centrally disposed on said annular bottom and extending axially toward said motor housing; said cylindrical extension has a diameter substantially corresponding to the diameter of said bore in said bearing plate; said cylindrical extension is subdivided into a plurality of axially extending projections; and at least some of said projections are provided with said hook portions at their free ends to form said plurality of detent hooks.

11. Apparatus as defined in claim 10 further comprising means for maintaining said coil in a desired position relative to said magnet within said closeable housing, said means for maintaining including an elastic substantially annular projection disposed on the inner surface of said cap and contacting said coil to press same against said annular bottom.

12. Apparatus as defined in claim 10 wherein said cap includes means for fastening said cap to said other end of said cylindrical member in a form locking and liquid tight manner.

13. Apparatus as defined in claim 12 wherein: said cap has cylindrical edge portion which surrounds said cylindrical member at its said other end; and said means for fastening said cap to said other end of said cylindrical member includes a bead and a mating circumferential groove, with one of said bead and said groove being formed on the inner surface of said cylindrical edge of said cap and the other being formed on the outer surface of said cylindrical member.

14. Apparatus as defined in claim 13 wherein said closeable housing is provided with an axially elongated opening for a connecting lead to said coil at said other end of said cylindrical member, with said elongated opening being partially covered by said cylindrical edge portion of said cap when said cap is fastened to said cylindrical member.

15. Apparatus as defined in claim 1 wherein at least a portion of the exterior surface of said housing bottom is coated with a soft-elastic sealing material for providing a seal between said motor and closeable housings.

16. Apparatus as defined in claim 1 wherein said closeable housing is formed of a plastic material.

* * * * *